UNITED STATES PATENT OFFICE.

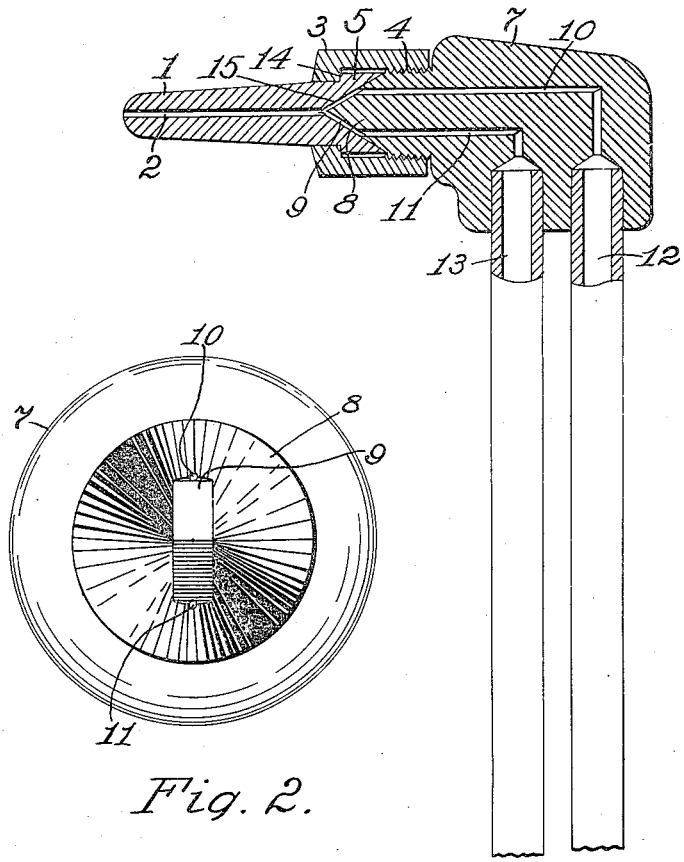

OSCAR T. ANDERSON, OF WATERLOO, IOWA.

OXYACETYLENE-BLOWPIPE.

1,299,535.  Specification of Letters Patent.  Patented Apr. 8, 1919.

Application filed June 1, 1918. Serial No. 237,691.

*To all whom it may concern:*

Be it known that I, OSCAR T. ANDERSON, a citizen of the United States of America, and a resident of Waterloo, Blackhawk county, Iowa, have invented certain new and useful Improvements in Oxyacetylene-Blowpipes, of which the following is a specification.

My invention relates to improvements in oxyacetylene blowpipes, and the object of my improvement is to efficiently and safely intermix oxygen and acetylene gases in a blowpipe for autogenic welding of iron and steel, by means of an improved and modified interior structure of the device and special arrangement and form of the channels and mixing-means thereof.

This object I have accomplished by the means which are hereinafter described and claimed, and which are illustrated in the accompanying drawings, in which Figure 1 is a medial longitudinal section of my improved oxyacetylene blowpipe, with parts broken away, and Fig. 2 is a magnified front elevation of the conical terminus of the body or shank of the blowpipe, in detail.

Similar numerals of reference denote corresponding parts throughout the several views.

The use of the oxyacetylene blowpipe in the autogenic welding and like operations on steel and iron is well known, but the safe application of same is desirable coupled with a simplified construction, and a structure whose channels and mixing means may be easily and conveniently cleaned or deprived of adherent coatings or masses of carbonaceous deposits. These features are embodied in my improved construction.

Referring to Fig. 1, the numeral 1 denotes an elongated conical tip or orificed nozzle, having the central longitudinal orifice or channel 2, the basal part of said nozzle having an annular shoulder 14, and having a conical hollow 15 alined and communicating with said orifice 2.

The body or shank 7 of the blowpipe has a conical terminus 8 closely fitting the conical hollow 15 of said tip and the shank is diminished to approach said conical terminus 8 in an exteriorly-threaded cylinder 4.

The numeral 3 denotes a hollow nut having interior threads fitting said threads 4, and an interior shoulder fitting the shoulder 14, whereby, when the nut is seated around the enlarged base 5 of the nozzle to engage its shoulder 14, and is meshed with the threads 4 on said shank, the nozzle part is drawn toward the shank to cause the fitted surfaces of the cone 8 and the hollow 15 to closely coincide to prevent leakage of gas therebetween.

The shank 7 contains the angular channels of capillary size shown at 10 and 11 and leading from the conduits 12 and 13 respectively for the carriage of oxygen and acetylene gases under a required pressure. These channels have their terminal openings at opposite locations in the conical surface of the cone 8, and the surface of said cone is removed by a planar section on both sides leading from said terminal openings to the apex of the cone to provide shallow passages for gases issuing from said openings converging toward said apex, meeting at the apex to immediately deliver into the capillary orifice or channel 2 in said nozzle 1. In other words, all the channels and passages mentioned are capillary, without enlargements where gases could accumulate in either a mixed or unmixed condition, and this is of the essence of my invention, which is to prevent any such accumulations, which are dangerous in the mixing of oxygen and acetylene gases, as such mixtures when pocketed in chambers in a highly heated structure, may back fire and explode.

The channels mentioned, therefore, are of restricted and capillary dimensions, and serve as conduits purely, although the converging planar passages 9 over the cone 8 permit the said gases to meet and mix under combined pressure at the apex of the cone to be delivered through the nozzle orifice 2.

Another important feature of the invention is the construction thereof permitting the disassembling of the nozzle 1 to expose the conical surfaces 15 and 8, and the planar passages 9. This permits the ready removal of any deposit of carbonaceous matter which may have clogged the channels. The channels mentioned are easily drilled through the respective structures, and the conical surfaces as easily formed and fitted accurately together when assembled.

Having described my invention, what I claim as new, and desire to secure by Letters Patent is:

1. In a device of the character described, a shank having channels for the conveyance of gases, and having a conical terminus whose opposite parts have shallow parts removed to leave planar faces converging from the openings of said channels to the apex, and an orificed nozzle having a conical basal hollow fitted removably upon said conical terminus to provide at the location of said planar faces capillary passages meeting and delivering into the capillary orifice of the nozzle.

2. In a device of the character described, a shank having capillary channels for the conveyance of gases, and having a conical terminus whose opposite parts have shallow planar faces along the cone thereof leading from the openings of the channels to the apex of the cone, a delivery-nozzle having a capillary orifice into which said shallow planar faces lead, said nozzle being fitted over said conical terminus to provide shallow capillary passages therebetween only at the location of said planar faces, and means for removably securing said nozzle upon said shank.

3. In a device of the character described, a body having two longitudinal capillary channels for the conveyance of gases under pressure, a delivery-nozzle mounted upon said body having a capillary delivery orifice alined with said body, the joining surfaces of said body and nozzle being formed to provide therebetween shallow flattened capillary passages leading from said channels into said delivery-orifice.

4. In a device of the character described, a structure terminating in a delivery-nozzle, said structure having separated channels for gases, and having flattened passages leading from said channels into said nozzle, all said communicating conduits being of capillary dimensions.

Signed at Waterloo, Iowa, this 17th day of May, 1918.

OSCAR T. ANDERSON.